Patented Mar. 2, 1926.

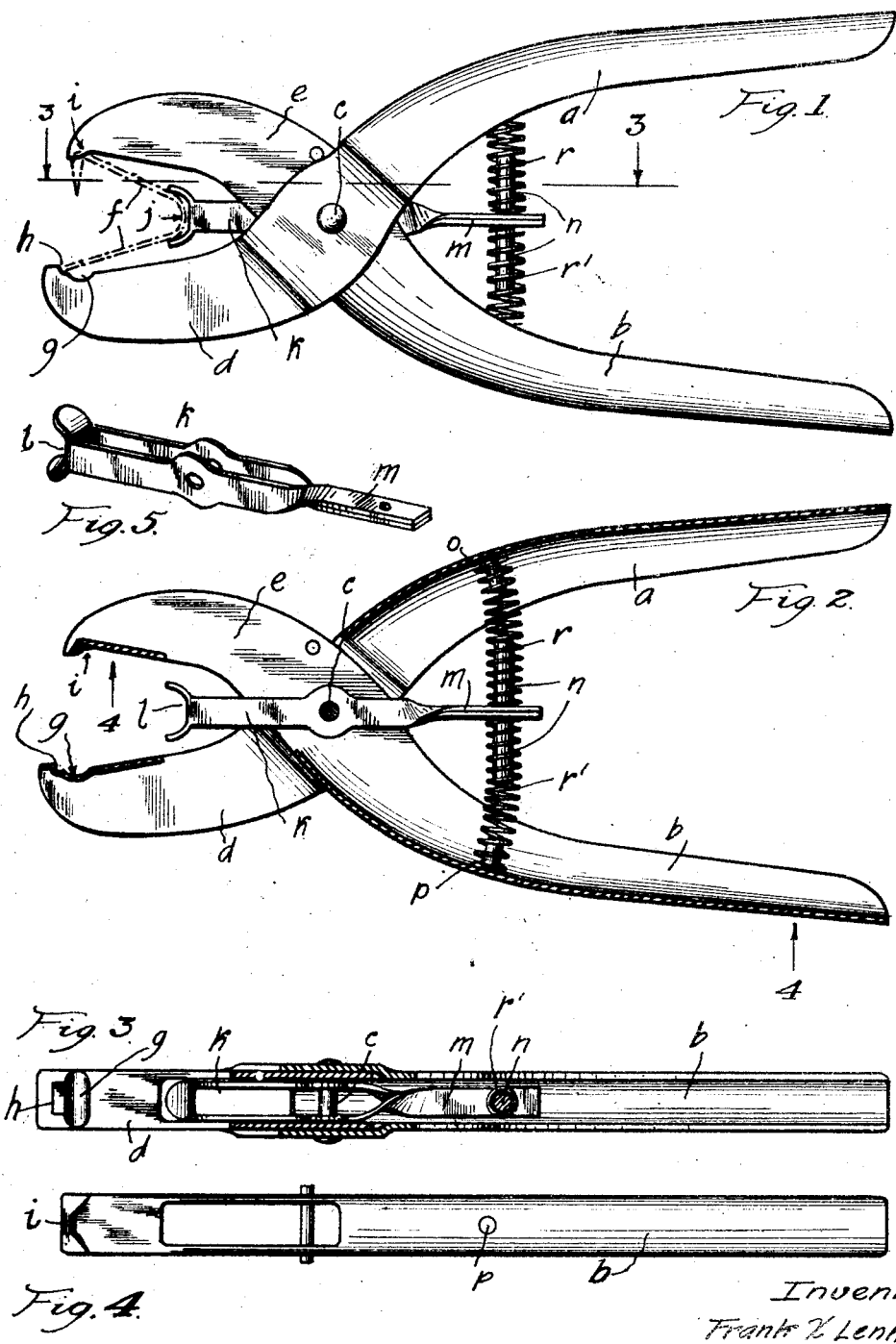

1,575,069

UNITED STATES PATENT OFFICE.

FRANK X. LENK, OF PORTLAND, OREGON, ASSIGNOR TO IRWIN-HODSON COMPANY, OF PORTLAND, OREGON.

EAR-TAG TONGS.

Application filed September 5, 1922. Serial No. 586,211.

*To all whom it may concern:*

Be it known that I, FRANK X. LENK, a citizen of the United States, and a resident of Portland, county of Multnomah, and State of Oregon, have invented a new and useful Improvement in Ear-Tag Tongs, of which the following is a specification.

My invention relates to tongs used for fastening identification tags on the ear lobes of animals.

The object of my present invention is to provide tongs which will securely hold the ear tag in position so that it will not become accidentally dislodged by any movement of the handles of the tongs or movement of the animal during the operation of fastening the tag.

A fault in prior ear tag tongs has been that if the animal moved during the operation the ear tag would either drop out or if it pierced the ear lobe it would not be clamped, hence have to be removed and another tag inserted, for if the tag is not properly secured it might merely bruise the ear and thus cause infection.

My invention in this respect is an improvement over the ear tag tongs on which Letters Patent of the United States were granted to me October 10, 1916, No. 1,200,943.

Since one arm of the tags which are to be affixed in place by my tongs have a sharp point and the extremity of the other arm has only a small hole thru which said point is to be projected and clamped, distortion of the tag point must be avoided, otherwise the point will not properly enter the hole and hence the arms of the tag will not be clamped together.

I attain the object of my invention in ear tongs of the character above referred to as heretofore having been patented to me, comprising pivotally connected levers having co-operating jaws provided with means for engaging the extremities of the arms of an ear tag thus to hold the latter against moving lengthwise in the jaws, and the tongs being provided with a centering arm extending between said jaws and provided at the extremity of such extension with a socket for receiving the heel of the ear tag.

The above described and other incidental features of my invention are hereinafter fully illustrated in the accompanying drawings, in which:

Fig. 1 is a side elevation of my improved ear tongs with an ear tag inserted in place between the jaws and illustrates how the tag is securely held in place after it is once inserted in the tongs;

Fig. 2 is a longtiudinal vertical section of my tongs and shows the means provided for holding the tag as mentioned;

Fig. 3 is a longitudinal, horizontal section taken on the line 3—3 of Fig. 1, further illustrating the construction of my tongs;

Fig. 4 is a view of the member $b$ of my tongs taken in the direction pointed by the arrows 4 in Fig. 2; and Fig. 5 is a perspective view of the centering arm, that is the piece which centers the ear tag in position and prevents it from slipping out of place during the ear piercing operation.

In the drawings, $a$ and $b$ represent the tong levers or members which are pivotally connected by a pin $c$.

The levers $a$ and $b$ are provided with jaws $d$ and $e$ respectively. The jaw $d$ of the lever $a$ is made with a concaved surface $g$ and a shoulder $h$, and the jaw $e$ of the member $b$ is made with a shoulder $i$. The shoulders $h$ and $i$ are adapted to accommodate, and serve as stops for, the extremities of the ear tag $f$, as shown by Fig. 1. When the tongs are operated its jaws will cause the ear tag to be effectually fastened in the object or material the tag is applied to.

In order to prevent the slipping of the ear tag while being fastened to the ear lobe I provide a centering arm $k$, which is pivoted on the pin $c$. Its forward end, projecting into the space between the jaws parallel therewith and made with a socket $l$, is adapted to receive and support the heel $j$ of the ear tag. The rear end $m$ of the centering arm extends between the handle ends of the levers $a$ and $b$ and is provided with a pin $n$ on which are mounted compression coil springs $r$, and $r'$, the opposite ends of which are mounted respectively on retaining pins $o$ and $p$, provided on the interior faces of the levers $a$ and $b$ respectively. These compression coil springs $r$ and $r'$ function as balancing members of, and hold the arm $k$, centrally positioned with respect to the jaws $d$ and $e$. In this way the centering arm $k$ is caused to hold the ear-tag $f$ in proper position for affixing it to the ear lobe.

The illustrations and description above given are merely intended to show a practical mode of construction of my device. The particular details of construction above described are, however, variable to suit the ideas of manufacturer provided such variation retains the essential features of my invention.

I claim:

1. In ear-tag tongs of the character described, comprising pivotally connected levers having cooperating jaws each provided with a pocket for engaging the extremities of the arms of an ear-tag, thus to hold the latter against moving lengthwise in the jaws, and a centering arm extending between said jaws and provided at the extremity of such extension with a socket for receiving the heel of the ear tag.

2. In ear-tag tongs of the character described, comprising pivotally connected levers having cooperating jaws each provided with means for engaging the extremities of the arms of an ear-tag, thus to hold the latter against moving lengthwise in the jaws, a pivoted centering arm extending between said jaws and provided at the extremity of such extension with a socket, said socket being arranged rearwardly of said engaging means on said arms, thus adapted for receiving the heel of the ear tag, and means, including springs, for holding the centering arm substantially centrally between the jaws at all times.

3. In ear-tag tongs of the character described, comprising pivotally connected levers having cooperating jaws provided with means for engaging the extremities of the arms of an ear-tag, thus to hold the latter against moving lengthwise in the jaws, a centering arm pivoted on the pivot axis of said levers, the opposite ends thereof extending between the jaws and the handle-ends of the levers, the end extending between the jaws being provided with a socket for receiving the heel of the ear-tag, the other end of the centering arm being provided with oppositely projecting pins, and springs seated on such pins and bearing against the inner faces of the handle ends of the levers, thereby holding the centering arm in substantially central position between the jaws at all times.

4. In ear-tag tongs of the character described, comprising pivotally connected levers having co-operating jaws each provided with means for engaging the extremities of the arm of an ear-tag, thus to hold the latter against moving lengthwise in the jaws, a pivoted centering arm extending between said jaws and provided at the extremity of such extension with a cup for receiving the heel of the ear-tag, said centering arm having yielding means for holding the same in substantially central position between the jaws at all times.

5. In ear-tag tongs of the character described, comprising pivotally connected levers having co-operating jaws each provided with means for engaging the extremities of the arm of an ear tag, thus to hold the latter against relative movement therewith, a pivoted centering arm extending between said jaws and provided at the extremity of such extension with a socket for receiving the heel of the ear-tag, said centering arm having yielding means for holding the same in substantially central position between the jaws at all times.

6. In ear-tag tongs of the character described, comprising pivotally connected levers having co-operating jaws provided with means for engaging the extremties of the arm of an ear-tag, thus to hold the latter against moving lengthwise in the jaws, a centering arm pivoted at a point approximately on the pivot axis of said levers, the opposite ends thereof extending between the jaws and the handle-ends of the levers, the end extending between the jaws being provided with a socket for receiving the heel of the ear-tag, the other end of the centering arm being provided with oppositely projecting pins, and springs seated on such pins and bearing against the inner faces of the handle-ends of the levers, thereby holding the centering arm in substantially central position between the jaws at all times.

7. In ear-tag tongs of the character described, comprising pivotally connected levers having co-operating jaws provided with means for engaging the extremities of the arm of an ear-tag, thus to hold the latter against moving lengthwise in the jaws, a centering arm pivoted approximately on the pivot axis of said levers, the opposite ends thereof extending between the jaws and the handle-ends of the levers, the end extending between the jaws being provided with a socket for receiving the heel of the ear-tag, a spring element normally spreading said jaws apart and holding the centering arm in substantially central position between the jaws at all times.

FRANK X. LENK.